Nov. 25, 1969    W. T. MATTHEWS    3,480,227
RETRACTOR DEVICE WITH COMPENSATING BRAKE
Filed May 21, 1968    2 Sheets-Sheet 1
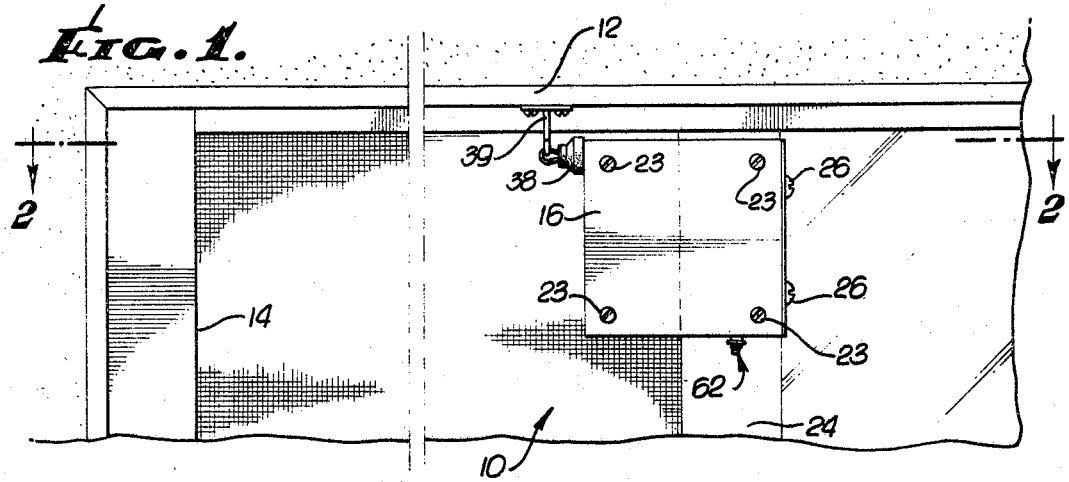
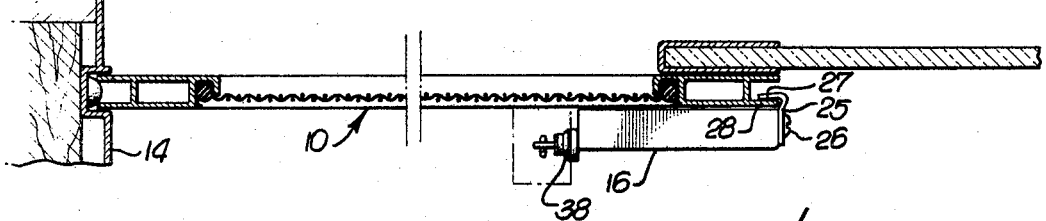
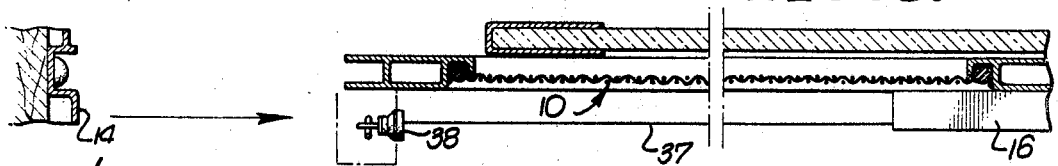
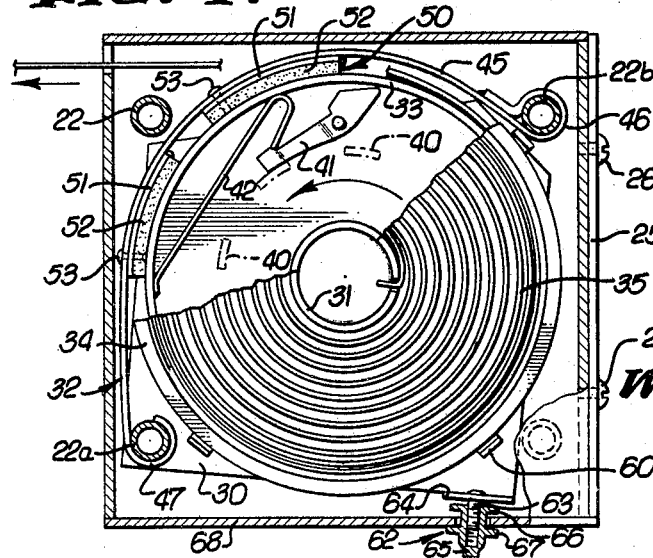
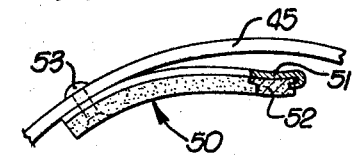
INVENTOR.
WALTER T. MATTHEWS
By Huebner & Worrel
ATTORNEYS.

Nov. 25, 1969  W. T. MATTHEWS  3,480,227
RETRACTOR DEVICE WITH COMPENSATING BRAKE
Filed May 21, 1968  2 Sheets-Sheet 2

INVENTOR.
WALTER T. MATTHEWS
By Huebner & Worrel
ATTORNEYS.

United States Patent Office 3,480,227
Patented Nov. 25, 1969

3,480,227
RETRACTOR DEVICE WITH COMPENSATING BRAKE
Walter T. Matthews, Van Nuys, Calif., assignor to Duplex, Inc., Los Angeles, Calif., a corporation of California
Filed May 21, 1968, Ser. No. 730,877
Int. Cl. B65h 75/48; F16d 63/00; E05f 1/08
U.S. Cl. 242—107.3         8 Claims

ABSTRACT OF THE DISCLOSURE

The device is a cable retractor wherein a cable drum and a brake drum are interrelated in a manner whereby a cable may be unwound from the cable drum against opposition of a spiral spring but free of any braking action, a band type of brake being provided which is applied to the brake drum during windup of the cable. The amount of braking force applied is controlled by the amount of tension on the cable. The principal improvement involved is in the form of the brake which provides compensation in the braking action ranging from a full area application of the brake when the tension is heavy to a lesser area application and decreasing force as the cable tension decreases.

BACKGROUND OF THE INVENTION

Field of the invention

Retractor devices of the general character disclosed have utility in conjunction with sliding screen doors, as an example, and for the suspension of work tools above a bench, and other environments wherein an object attached to the end of a cable may be moved by pulling on the cable against the action of a spiral spring. The purpose of the spring is to retract the object when the pulling force is released. In order to dampen and control the effect of the action of the spiral spring on the return winding of the cable, a braking mechanism is physically associated with the cable drum. This functions in a manner to interlock with the cable drum for common rotation in the windup direction of the cable. In the absence of a brake there would be a tendency for the spring to rapidly wind up the cable which, in the case of a screen door, would slam it shut. The brake is utilized to slow and control the windup action of the spring and should function in a manner to impart the greatest braking action at the start of the retraction when the force of the spring is greatest, and reduce the braking action as the windup proceeds and the spring action force diminishes. The functional objective is a smooth, even retraction, and, in the case of a screen door, for example, a soft closing thereof.

Description of the prior art

The most pertinent prior art known to applicant is U.S. Patent No. 3,332,638, granted July 25, 1967, on an application of James B. Jessup and Walter T. Matthews (the latter being the inventor of the present improvement). In that patent a retractor device is disclosed embodying a cable drum and brake drum mounted on a common axle which protrudes from an axle plate which is pivoted in a housing. The axle plate, and consequently the axle, is adapted for pivotal shifting transversely of the axis of the axle. A brake band encircles the brake drum for most of the periphery thereof, the ends of the brake band being joined and fixedly secured in the housing.

Tension on the cable to unwind it as it is withdrawn shifts the cable drum, and consequently the brake drum, in a direction to bring the brake drum into frictional engagement with the brake band. When pulling force on the cable is released the brake drum and the cable drum become automatically interlocked and a braking action is imparted to the interlocked drums. As the cable winds up and the tension of the spiral spring becomes less, the cable drum and brake drum on their common axle tend to shift toward the original position on the pivotal mounting of the axle plate.

The metal-to-metal contact between brake drum and brake band as well as the large area of contact between those two parts sometimes results in a harsh braking action, particularly under light loads.

SUMMARY OF THE INVENTION

The present invention is an improvement upon the device disclosed in U.S. Patent No. 3,332,638. It utilizes a cable drum and a brake drum rotatably mounted on a common axle, related in a general manner corresponding to the structure in the aforesaid patent, the principal feature of the improvement being in the construction and operation of the brake band assembly.

The improved brake band assembly comprises a generally semicircular stiff but flexible brake band suitably mounted at its opposite ends to fixed structure in the housing which encloses the operative parts. One or more brake shoes are interposed between the brake band and the brake drum. These shoes may comprise leaf spring members riveted or otherwise secured to the inner surface of the brake band, the leaves being faced with a relatively soft but tough brake lining such for example as a rubber impregnated with ground cork. The mounting of each brake shoe on the brake band is so arranged as to have the shoe form an angle with the brake band originating at the end where the two are united. Thus, when the drum assembly is shifted to the maximum extent against the brake band assembly due to a heavy tension on the cable, the brake shoes are pressed out against the inner surface of the brake band and the full braking effect provided by these shoes is realized. As tension lessens and the drum assembly begins to shift away from the brake band, the spring characteristics of the backing for the brake lining will cause the free ends of the brake shoes to follow the brake drum in the direction if shifts away and gradually to lessen the area of contact between the brake shoes and the drum. Thus, a nice compensating action is accomplished and the braking is smooth and responsive to the amount of tension on the cable.

The foregoing as well as other features and objects of the present invention will become further apparent from a consideration of the drawings and the subsequent description.

BRIEF DESCRIPTION OF THE DRAWINGS

FIGURE 1 is a front elevation of a portion of a screen door assembly illustrating the retractor device applied thereto.

FIGURE 2 is a horizontal section taken on the line 2—2 of FIGURE 1.

FIGURE 3 is a view similar to FIGURE 2 showing the screen door opened and the cable of the retractor device extended.

FIGURE 4 is a vertical section of the retractor device with the parts shown in cable unwinding or unwound condition as occurs in FIGURE 3, and in which condition the brake band assembly is disposed in braking relationship to the brake drum.

FIGURE 10 is an enlarged fragmentary view, partly in section, of a brake band assembly.

DESCRIPTION OF THE PREFERRED EMBODIMENT

Figure 5:
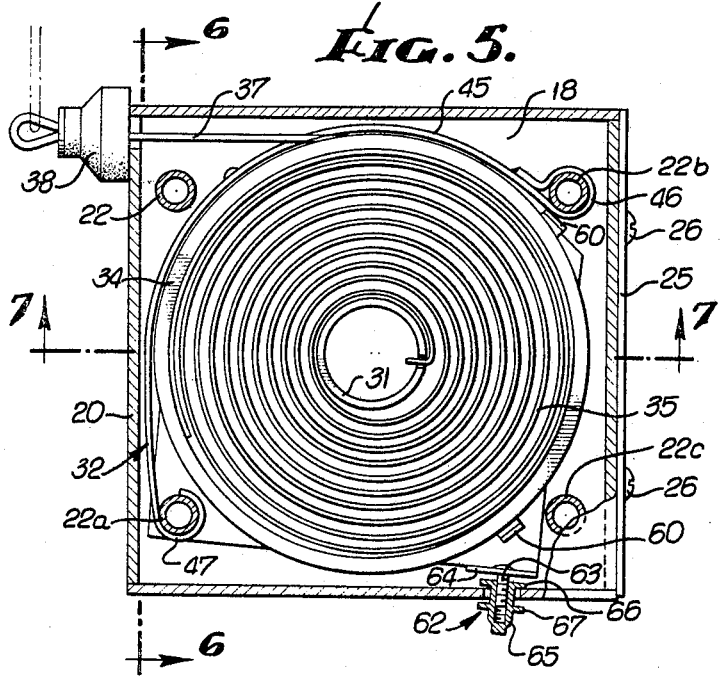
FIGURE 5 is another sectional view of the retractor device showing the spiral spring and the cable in retracted position.
Figure 6:
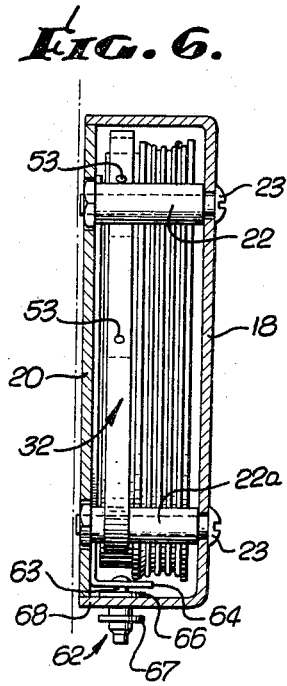
FIGURE 6 is a vertical section taken on the line 6—6 of FIGURE 5.
Figure 7:
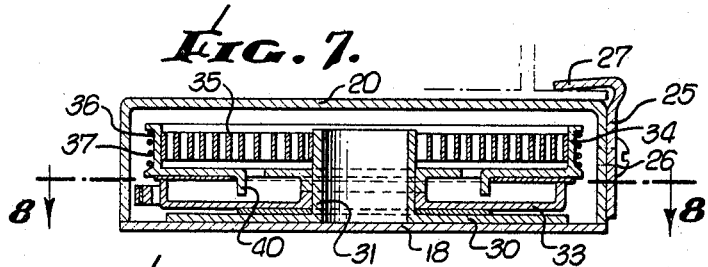
FIGURE 7 is a horizontal section taken on the line 7—7 of FIGURE 5.

A typical sliding screen door 10 shown in FIGURES 1, 2 and 3 is mounted in a doorway frame 12 and closes on a doorjamb 14. A retractor 16 embodying the present invention is secured to the door 10.

The preferred form of retractor 16 includes a housing which is shaped like a shallow box and is comprised of a base member 18 and cover 20. Protruding vertically from the corners of base member 18 are tubular posts 22, 22a, 22b, and 22c, which function as spacing members and through which bolts 23 (or rivets) may extend for holding the base member and cover together.

The mounting on a frame 24 of the screen door may be effected by a clip 25 secured by screws 26 to a side edge of the housing cover. The clip is formed with a flange 27 which clamps against the inner surface of a wall 28 of the doorframe 24. Other suitable means may be utilized if desired for securing the housing to the doorframe.

Post 22a provides a pivotal anchoring for an axle plate 30 and also affords an anchorage for one end of a brake band assembly 32. Post 22b provides an anchorage for the opposite end of the brake band assembly.

The axle plate incorporates an integral axle 31. On this axle are independently mounted for rotation a brake drum 33 and a cable drum 34. The brake drum is in position to have braking engagement with the brake band assembly 32. The cable drum houses a spiral watch-type spring 35 and on the peripheral surface 36 of the cable drum is wound a flexible cable 37.

The free end of the cable 37 terminates in a stop member 38 which may be coupled to a permanent bracket or other attachment 39 on the doorframe 12, so that when the door is moved to open it, the cable will pay out from the cable drum.

Figure 8:
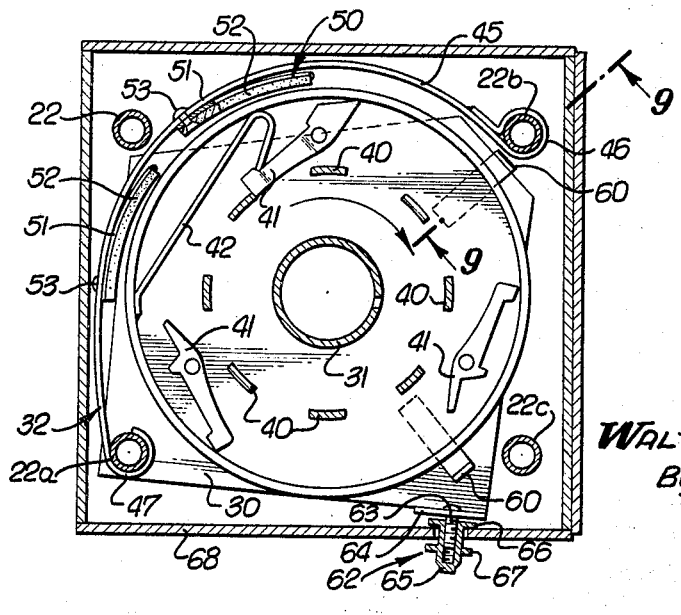
FIGURE 8 is a vertical section taken on the line 8—8 of FIGURE 7.
Figure 9:
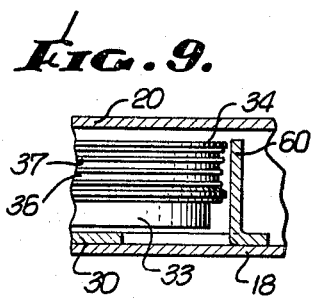
FIGURE 9 is a fragmentary section taken on the line 9—9 of FIGURE 8.

A one-way connection between the cable drum and the brake drum is provided by the following structure. The cable drum is formed with a plurality of concentrically arranged stop members 40 which project into the interior of the brake drum. Pivotally mounted on the brake drum is a plurality of latch members 41. These are concentrically arranged and positioned for the latch members to ride over the stop members 40 when the cable drum is turning counterclockwise as viewed in FIGURES 4 and 5 and to engage the stop members 40 in an interlocking relationship as shown in FIGURE 8 when the cable drum is rotating under the influence of the spiral spring in a clockwise direction as viewed in these figures. Each latch member is overweighted at its stop engagement end so that if there is no biasing spring employed the weighted end will fall by gravity into position for engagement with a stop member. However, it is desirable to employ a leaf spring 42 on at least one of the latch members in order to bias the latch member into engagement with the stop member.

Thus, when the cable is withdrawn, the assembly of cable drum and brake drum on their common axle 31 rotates on post 22a to bring the brake drum in full contact with the band brake assembly (FIGURE 4). However, the brake has no effect during this operation because the cable drum is freewheeling with respect to the brake drum. On the windup of the cable however, the two drums are rotationally interlocked and the brake band assembly acts to retard the windup or clockwise rotation of the brake drum and consequently the cable drum.

The improved brake band assembly 32 of the present invention embodies a stiff but flexible (spring-like) band 45 which terminates in a closed loop 46 for anchorage on the post 22b, and at its other end the band is looped as at 47 around the post 22a.

The braking surface is provided by one or more brake shoes 50. It should be noted that the radial separation between the periphery of the brake drum and the inner surface of the brake band 45 is greater than the thickness of the brake shoes 50, when the retractor is in repose or inactive (FIGURE 8).

Each pad comprises a backing 51 of spring material to which a relatively soft but tough lining 52 is secured. The assembly of backing and lining is secured to the inner surface of the band 45 by means of a rivet 53, and the attachment is such that in the absence of pressure upon the brake shoe the same will be disposed in a position diverging from the rivet 53 radially inwardly from the band 45 toward the axis of the drums. The purpose of this is to feather or progressively reduce the braking effect as tension on the cable lessens.

When the brake first comes into action as the result of lateral shifting of the axle 31 on the pivot provided by post 22a, the brake shoes will be in substantially full area engagement with the brake drum as illustrated in FIGURE 4. As the tension lessens and the brake drum shifts to the right as viewed in FIGURES 4 and 8, full area braking engagement ceases and the area of contact between the brake shoes and the drum decreases gradually, being sustained in a diminishing manner by the spring action of the backing member 51.

Another improvement feature resides in lugs 60 which are struck up from the axle plate 30 to guard the cable against running off the periphery of the cable drum in the event of a malfunction or unexpected slack and jamming of the cable.

Another feature is the provision of an adjusting screw assembly 62 which can be utilized to adjust the relationship between brake band assembly and brake drum as well as to completely disengage the brake band assembly. This screw assembly 62 comprises a threaded stud 63 extending outwardly through the wall of the housing, from a flange 64 on the swivel plate. The stud is engageable with a nut 65 provided with spaced apart flanges 66 and 67, the complementary faces of which are adapted to engage one side or the other of the adjacent housing wall 68. Thus, the extent to which the nut is threaded on the stud 63 will regulate the distance which the swivel plate can be shifted. and the nut may be advanced far enough so that the flange 67 in engagement with the outer surface of the housing wall will restrict shifting completely so that the brake in effect remains wholly disengaged.

Although I have herein shown and described my invention in what I have conceived to be the most practical and preferred embodiment, it is recognized that departures may be made therefrom within the scope of my invention.

What I claim is:

1. In a retractor device comprising a flexible member, a rotatable cable drum about which the flexible member is wound, a spiral spring rotatably biasing the cable drum, a rotatable brake drum, ratchet means which locks the brake drum to the cable drum only when the cable drum is rotated by the spiral spring in the direction to wind up the flexible member, the improvement which comprises a brake band, a brake shoe carried by the band in position to engage the brake drum, said shoe being attached to said brake band in a manner to yieldably dispose the shoe in a position diverging from the surface of the band whereby application of the braking surface of the shoe to the drum may range from full to fractional.

2. A device as defined in claim 1 in which the periphery of the brake drum and the inner surface of the brake band are radially spaced apart when the brake drum is fully disengaged from the brake shoe a sufficient distance for the brake shoe to lie at an angle to the inner surface of the brake band.

3. A device as defined in claim 1 wherein the brake band is generally semicircular in profile, fixed means are provided for mounting each end of the band, and the drums are mounted for limited transverse movement so that the brake drum can be moved toward or away from the brake band.

4. A device as defined in claim 1 wherein the brake shoe comprises a spring backing and a generally soft but tough lining.

5. A device as defined in claim 4 wherein the spring backing is metal, and the lining is rubber impregnated with cork.

6. A device as defined in claim 1 which includes an axle plate, an axle extending from the plate, the drums being concentrically mounted on the axle, and an additional improvement comprising lugs extending from the axle plate normal thereto and in proximity to the periphery of the cable drum to guard the flexible member against running off the drum.

7. A device as defined in claim 1 wherein the ratchet means is an additional improvement, said ratchet means comprising stop members on the cable drum extending into the brake drum, the brake drum carrying a plurality of pivotally mounted latch members aligned to ride over the stop members when the cable drum is rotated in one direction, the latch members being overweighted on one side of their pivotal mounting to cause at least one of them to fall by gravity into engagement with a stop member when the cable drum is rotated in the opposite direction.

8. A device as defined in claim 3 which includes a housing, spaced apart posts in the housing, an axle plate pivotally anchored on one of said posts, an axle on the plate, the drums being concentrically mounted on the axle, an additional improvement being a control device for limiting the transverse movement of the drums comprising a threaded stud mounted on the axle plate and extending through the housing, a nut engaged with the stud embodying axially spaced apart flanges one of which can be engaged against the inside of the housing and the other of which can be engaged against the outside of the housing.

References Cited

UNITED STATES PATENTS

| 2,079,054 | 5/1937 | Vadasz | 188—82.1 XR |
| 2,112,650 | 3/1938 | Girard | 16—198 |
| 2,603,430 | 7/1952 | Hofer | 242—107.3 |
| 3,020,580 | 2/1962 | Glenn | 242—107.3 XR |
| 3,021,089 | 2/1962 | Becker | 242—107.3 |
| 3,042,239 | 7/1962 | Gschwind | 242—107.4 |

STANLEY N. GILREATH, Primary Examiner

WERNER H. SCHROEDER, Assistant Examiner

U.S. Cl. X.R.

16—78; 188—82.6; 242—99